(12) United States Patent
Kawahara

(10) Patent No.: US 6,653,252 B2
(45) Date of Patent: Nov. 25, 2003

(54) METHOD OF MANUFACTURING ELECTRODE OR ELECTRODE-ELECTROLYTE MEMBRANE JOINT BODY FOR FUEL CELL AND ELECTRODE FOR FUEL CELL

(75) Inventor: Tatsuya Kawahara, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 91 days.

(21) Appl. No.: 09/973,731

(22) Filed: Oct. 11, 2001

(65) Prior Publication Data
US 2002/0034677 A1 Mar. 21, 2002

Related U.S. Application Data

(62) Division of application No. 09/149,080, filed on Sep. 8, 1998, now abandoned, which is a continuation of application No. 08/749,400, filed on Nov. 15, 1996, now abandoned.

(30) Foreign Application Priority Data

Jan. 19, 1996 (JP) .............................................. 8-025989

(51) Int. Cl.[7] ................................................. H01M 4/88
(52) U.S. Cl. .......................................... 502/101; 264/42
(58) Field of Search ..................... 429/40, 42; 502/101; 264/42

(56) References Cited

U.S. PATENT DOCUMENTS 3,097,974 A  7/1963  McEvoy et al.
3,423,247 A  1/1969  Darland, Jr. et al.

(List continued on next page.)

FOREIGN PATENT DOCUMENTS

| DE | 3437472 A1 | 4/1986 | | |
|---|---|---|---|---|
| JP | 61-88455 | 5/1986 | | |
| JP | 62-281272 | * 12/1987 | ............ | H01M/4/88 |
| JP | 6-36771 | 2/1994 | | |
| JP | 6-203852 | 7/1994 | | |
| JP | 7-57738 | * 3/1995 | ............ | H01M/4/88 |
| WO | WO 95/20691 | 8/1995 | | |

OTHER PUBLICATIONS

Abstract Number 125:200822 (w/Patent Abstracts of Japan, Publication Number 08185867, Publication Date of Jul. 16, 1996).

(List continued on next page.)

Primary Examiner—Stephen Kalafut
(74) Attorney, Agent, or Firm—Oblon, Spivak, McClelland, Maier & Neustadt, P.C.

(57) ABSTRACT

A paste-like ink is prepared by dissolving camphor in an alcoholic solvent and dispersing fine carbon particles with a catalyst carried thereon in the solvent (step S100). A sheet-like electrode-forming member is formed on an electrolyte membrane by screen printing the paste-like ink thus obtained (step S102). The electrode-forming member is dried at 80° C. for one hour, in order to deposit camphor included in the electrode-forming member as a pore-forming agent (step S104). The electrode-forming member and the electrolyte membrane are joined with each other by hot pressing (step S106). The joint body of the electrode-forming member and the electrolyte membrane is dried under vacuum at 80° C. for three hours, in order to sublimate and remove camphor depositing in the electrode-forming member (step S108). This gives an electricity-generating layer that is a joint body of an electrode having a plurality of pores and the electrolyte membrane. The manufacturing process of the invention thus gives a joint body of an electrode having sufficient gas permeability and electrical conductivity and an electrolyte membrane.

8 Claims, 8 Drawing Sheets

U.S. PATENT DOCUMENTS

| | | | |
|---|---|---|---|
| 3,567,520 A | | 3/1971 | Dennery et al. |
| 4,044,193 A | | 8/1977 | Petrow et al. .................. 429/40 |
| 4,469,579 A | | 9/1984 | Covitch et al. .............. 204/283 |
| 4,581,116 A | | 4/1986 | Plowman et al. ............ 204/284 |
| 4,659,528 A | * | 4/1987 | Plowman et al. .......... 264/42 X |
| 4,822,699 A | | 4/1989 | Wan ............................ 429/40 |
| 4,832,881 A | * | 5/1989 | Arnold et al. ........... 502/101 X |
| 5,116,592 A | | 5/1992 | Weinberg ................ 423/415 R |
| 5,330,860 A | | 7/1994 | Grot et al. ...................... 429/42 |
| 5,364,712 A | | 11/1994 | Townsend ..................... 429/42 |
| 5,470,448 A | * | 11/1995 | Molter et al. .............. 429/40 X |
| 5,945,231 A | | 8/1999 | Narayanan et al. ............ 429/30 |

OTHER PUBLICATIONS

Chemical Abstracts Number 114: 167859w (w/Patent Abstracts of Japan, Publication Number 02215049, Publication Date of Aug. 28, 1990).

Patent Abstract of Japan, Publication Number 0808807, Publication Date of Apr. 2, 1996.

Abstract Number 108:115868 (w/Patent Abstracts of Japan Publication Number 62281272, Publication Date of Dec. 7, 1987).

Abstract Number 108:2243422 (w/Patent Abstracts of Japan Publication Number 63048752, Publication Date of Mar. 1, 1988).

Abstract Number 122:35176 (w/Patent Abstracts of Japan Publication Number 06267545, Publication Date of Sep. 22, 1994).

Abstract Number 125:200820 (w/Patent Abstracts of Japan Publication Number 08185865, Publication Date of Jul. 16, 1996).

* cited by examiner

METHOD OF MANUFACTURING ELECTRODE OR ELECTRODE-ELECTROLYTE MEMBRANE JOINT BODY FOR FUEL CELL AND ELECTRODE FOR FUEL CELL

This application is a Division of application Ser. No. 09/149,080 Filed on Sep. 8, 1998, which is a continuation of U.S. application Ser. No. 08/749,400, filed Nov. 15, 1996, both now abandoned.

BACKGROUND OF THE INVENTION

1. Field of the Invention

The present invention relates to a method of manufacturing an electrode or an electrode-electrolyte membrane joint body for a fuel cell as well as to an electrode for a fuel cell. More specifically, the present invention pertains to a method of manufacturing an electrode for a fuel cell, which has a plurality of pores and includes carbon particles with a catalyst carried thereon, to a method of manufacturing an electrode-electrolyte membrane joint body for a fuel cell, which is obtained by joining such an electrode with an electrolyte membrane composed of a polymer electrolyte, and to such an electrode for a fuel cell.

2. Description of the Prior Art

In fuel cells, such as polymer electrolyte fuel cells, supplies of a gaseous fuel containing hydrogen and an oxidizing gas containing oxygen are fed respectively to two electrodes (fuel electrode and oxygen electrode) which are arranged across an electrolyte membrane, so that reactions expressed as formulae (1) and (2) given below occur to directly convert the chemical energy to electrical energy:

Anode reaction (fuel electrode):

$$H_2 \rightarrow 2H^+ + 2e^- \quad (1)$$

Cathode reaction (oxygen electrode):

$$2H^+ + 2e^- + (\tfrac{1}{2})O_2 \rightarrow H_2O \quad (2)$$

In order to enable these reactions to proceed in a continuous and smooth manner, the fuel electrode requires continuous supplies of water and a gaseous fuel that allow the generated hydrogen ions to be smoothly diffused into the electrolyte membrane by hydration, while the oxygen electrode requires a continuous supply of an oxidizing gas as well as quick removal of generated water. Close contact of the electrolyte membrane with both the electrodes is further required to yield a fuel cell having a small contact resistance and a high efficiency.

Several methods have been proposed to manufacture a joint body of an electrode and an electrolyte membrane which satisfies the requirements discussed above (for example, JAPANESE PATENT LAYING-OPEN GAZETTE No. 6-203852). In accordance with a concrete procedure of the conventional method, a sheet-like electrode-forming member is prepared by mixing powder of a metal, such as zinc, aluminum, or chromium, or a metal salt (particle diameter: 20 μm) with carbon particles having a catalyst carried thereon. After the electrode-forming member thus obtained is joined with a polymer electrolyte membrane, the electrode-forming member is soaked in a highly acidic aqueous solution, so that the metal or metal salt included in the electrode-forming member is dissolved and removed. This gives a joint body of an electrode having pores therein and an electrolyte membrane.

The conventional method of manufacturing a joint body of an electrode and an electrolyte membrane discussed above, however, has a problem, that is, metal ions dissolved in a highly acidic aqueous solution deteriorate the performance of the electrolyte membrane. The powdery metal or metal salt included in the electrode-forming member as the pore-forming agent is expected to be dissolved in a highly acidic aqueous solution and thereby removed. Even a very small quantity of metal ions remaining in the electrolyte membrane, however, combine to functional groups in the electrolyte membrane and thus drastically deteriorate the performance of the electrolyte membrane.

Another problem arising in the conventional method of manufacturing a joint body of an electrode and an electrolyte membrane is that the powdery metal or metal salt included in the electrode-forming member as the pore-forming agent is locked in the electrode and may thus not be dissolved in a highly acidic aqueous solution. When the pore-forming agent is locked inside the electrode, the resulting electrode does not have a sufficient number or size of pores. This results in insufficient permeation of a gaseous fuel or an oxidizing gas and insufficient supply and removal of water, thereby lowering the performance of the electrode.

SUMMARY OF THE INVENTION

One object of the present invention is thus to provide a method of manufacturing an electrode for a fuel cell that has sufficient gas permeability and electrical conductivity.

At least part of the above objects is realized by a first method of the present invention for manufacturing an electrode for a fuel cell. The first method of manufacturing an electrode for a fuel cell, the electrode having a plurality of pores and comprising carbon particles with a catalyst carried thereon, the first method comprising the steps of: (a) preparing an electrode-forming member comprising the carbon particles and a pore-forming agent that can be sublimed; and (b) subliming the pore-forming agent by setting the electrode-forming member under a predetermined condition.

The first method of the present invention for manufacturing an electrode for a fuel cell gives an electrode having a plurality of pores and sufficient gas permeability and electrical conductivity. The electrode-forming member is placed under a predetermined condition with a view to sublimating the pore-forming agent. This effectively prevents metals ions from remaining and lowering the performance of the electrolyte membrane and the pore-forming agent from being locked inside the electrode.

In accordance with one aspect of the present invention, the step (a) of the first method further comprises the steps of: (a1) dissolving the pore-forming agent into a solvent that allows dissolution of the pore-forming agent and dispersing the carbon particles in the solvent, so as to prepare a solution for forming a paste-like electrode; (a2) forming the solution prepared in the step (a1) into a predetermined shape of the electrode-forming member; and (a3) depositing the pore-forming agent dissolved in the solution formed into the predetermined shape in the step (a2). This structure enables the pore-forming agent to be uniformly present in the electrode-forming member, thereby allowing pores to be uniformly formed in the electrode. This further improves the performance of the electrode. The pore-forming agent generally deposits to have a needle-like or plate-like shape, which does not cause a space greater than that required for permeation of a gas in the electrode. In accordance with one aspect of this structure, the step (a3) further comprises the step of drying the solution formed into the predetermined shape, so as to make concentration of the pore-forming agent in the solution equal to or higher than its solubility, thereby allowing deposition of the pore-forming agent. In accordance with another aspect of this structure, the steps (a1) and (a2) are carried out at a predetermined temperature that allows solubility of the pore-forming agent in the solvent to be equal to or higher than a predetermined level. The solubility of the pore-forming agent in the solvent can be set to a desired level. The porosity of the electrode (that is, the ratio of pores) can thus be freely controlled by adjusting the amount of the pore-forming agent dissolved in the solvent.

The present invention is also directed to a second method of the present invention for manufacturing an electrode for a fuel cell. The second method of manufacturing an electrode for a fuel cell, the electrode having a plurality of pores and comprising carbon particles with a catalyst carried thereon, the method comprising the steps of: (a) dispersing the carbon particles in a solvent that can be freeze-dried, so as to prepare a solution for forming a paste-like electrode; (b) forming the solution prepared in the step (a) into a predetermined shape of the electrode; and (c) freeze-drying the solvent of the solution formed into the predetermined shape in the step (b) under a specified condition.

The second method of the present invention for manufacturing an electrode for a fuel cell gives an electrode having a plurality of pores and sufficient gas permeability and electrical conductivity. The plurality of pores are formed in the electrode by freeze-drying the solvent. This method accordingly does not require any specific pore-forming agent. This effectively prevents metals ions from remaining and lowering the performance of the electrolyte membrane and the pore-forming agent from being locked inside the electrode.

Other objects of the present invention are to enable an electrolyte membrane to maintain its high performance and to provide an efficient method of manufacturing a joint body of an electrode and such an electrolyte membrane.

At least part of the objects is realized by a first method of the present invention for manufacturing an electrode-electrolyte membrane joint body for a fuel cell. The first method of manufacturing an electrode-electrolyte membrane joint body for a fuel cell, the electrode-electrolyte membrane joint body being obtained by joining an electrode having a plurality of pores and comprising carbon particles with a catalyst carried thereon with an electrolyte membrane mainly composed of a polymer electrolyte, the method comprising the steps of: (a) preparing an electrode-forming member comprising the carbon particles and a pore-forming agent that sublimes under a specified condition; (b) joining the electrode-forming member prepared in the step (a) with the electrolyte membrane under a certain condition other than the specified condition to yield a joint body; and (c) subliming the pore-forming agent by setting the joint body of the electrode-forming member and the electrolyte membrane under the specified condition.

The first method of the present invention for manufacturing an electrode-electrolyte membrane joint body for a fuel cell gives a joint body of an electrolyte membrane and an electrode having a plurality of pores and sufficient gas permeability and electrical conductivity. The electrode-forming member and the electrolyte membrane are joined with each other prior to the sublimation of the pore-forming agent, so that the pores formed in the electrode are not destroyed by the joining process. The joint body of the electrode-forming member and the electrolyte membrane is placed under a predetermined condition with a view to sublimating the pore-forming agent. This effectively prevents metals ions from remaining and lowering the performance of the electrolyte membrane and the pore-forming agent from being locked inside the electrode.

In accordance with one aspect of the first method for manufacturing an electrode-electrolyte membrane joint body, the step (a) further comprises the steps of: (a1) dissolving the pore-forming agent into a solvent that allows dissolution of the pore-forming agent and dispersing the carbon particles in the solvent, so as to prepare a solution for forming a paste-like electrode; (a2) forming the solution prepared in the step (a1) into a predetermined shape of the electrode-forming member; and (a3) depositing the pore-forming agent dissolved in the solution formed into the predetermined shape in the step (a2). This structure enables the pore-forming agent to be uniformly present in the electrode-forming member, thereby allowing pores to be uniformly formed in the electrode. This further improves the performance of the electrode. The pore-forming agent generally deposits to have a needle-like or plate-like shape, which does not cause a space greater than that required for permeation of a gas in the electrode.

In accordance with one aspect of this structure, the step (a3) further comprises the step of drying the solution formed into the predetermined shape, so as to make concentration of the pore-forming agent in the solution equal to or higher than its solubility, thereby allowing deposition of the pore-forming agent. In accordance with another aspect of this structure, the steps (a1) and (a2) are carried out at a predetermined temperature that allows solubility of the pore-forming agent in the solvent to be equal to or higher than a predetermined level. The solubility of the pore-forming agent in the solvent can be set to a desired level. The porosity of the electrode can thus be freely controlled by adjusting the amount of the pore-forming agent dissolved in the solvent.

The present invention is further directed to a second method of manufacturing an electrode-electrolyte membrane joint body for a fuel cell. The second method of manufacturing an electrode-electrolyte membrane joint body for a fuel cell, the electrode-electrolyte membrane joint body being obtained by joining an electrode having a plurality of pores and comprising carbon particles with a catalyst carried thereon with an electrolyte membrane mainly composed of a polymer electrolyte, the method comprising the steps of: (a) dispersing the carbon particles in a solvent that can be freeze-dried, so as to prepare a solution for forming a paste-like electrode; (b) forming the solution prepared in the step (a) into a predetermined shape of the electrode on the electrolyte membrane; and (c) freeze-drying the solvent by setting the solution formed into the predetermined shape in the step (b) under a specified condition.

The second method of the present invention for manufacturing an electrode-electrolyte membrane joint body for a fuel cell gives a joint body of an electrolyte membrane and an electrode having a plurality of pores and sufficient gas permeability and electrical conductivity. The plurality of pores are formed in the electrode by freeze-drying the solvent. This method accordingly does not require any specific pore-forming agent. This effectively prevents metals ions from remaining and lowering the performance of the electrolyte membrane and the pore-forming agent from being locked inside the electrode.

Still another object of the present invention is to provide an electrode for a fuel cell that has sufficient gas permeability and electrical conductivity.

At least part of the above objects is realized by an electrode for a fuel cell. The electrode of the present invention comprising carbon particles with a catalyst carried thereon and a space of three-dimensional diversified structure that is made of a plurality of pores having various diameters.

The electrode of the present invention has a space of three-dimensional diversified structure that is made of a plurality of pores having various diameters. This structure improves the gas permeability and electrical conductivity.

In accordance with one aspect of the present invention, the pores formed in the electrode have diameters ranging from 0.02 to 0.3 μm. The pores of small diameters further improve the gas permeability and electrical conductivity.

DESCRIPTION OF THE PREFERRED EMBODIMENTS

Figure 1:
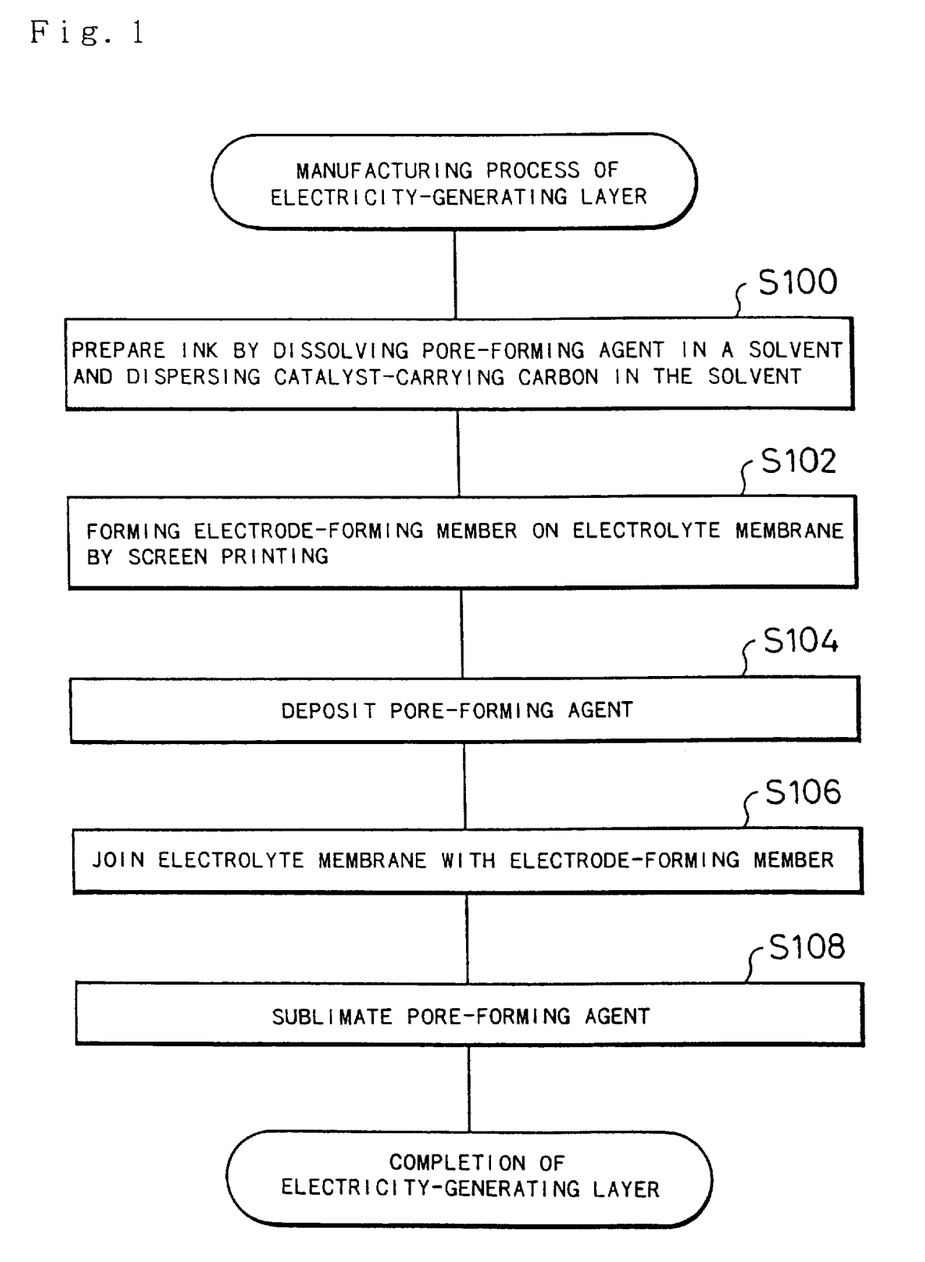
FIG. 1 is a flowchart showing a typical routine of manufacturing an electricity-generating layer 10 that is a joint body of an electrolyte membrane 12 and a catalyst electrode 14 and embodies the present invention.
Figure 2:
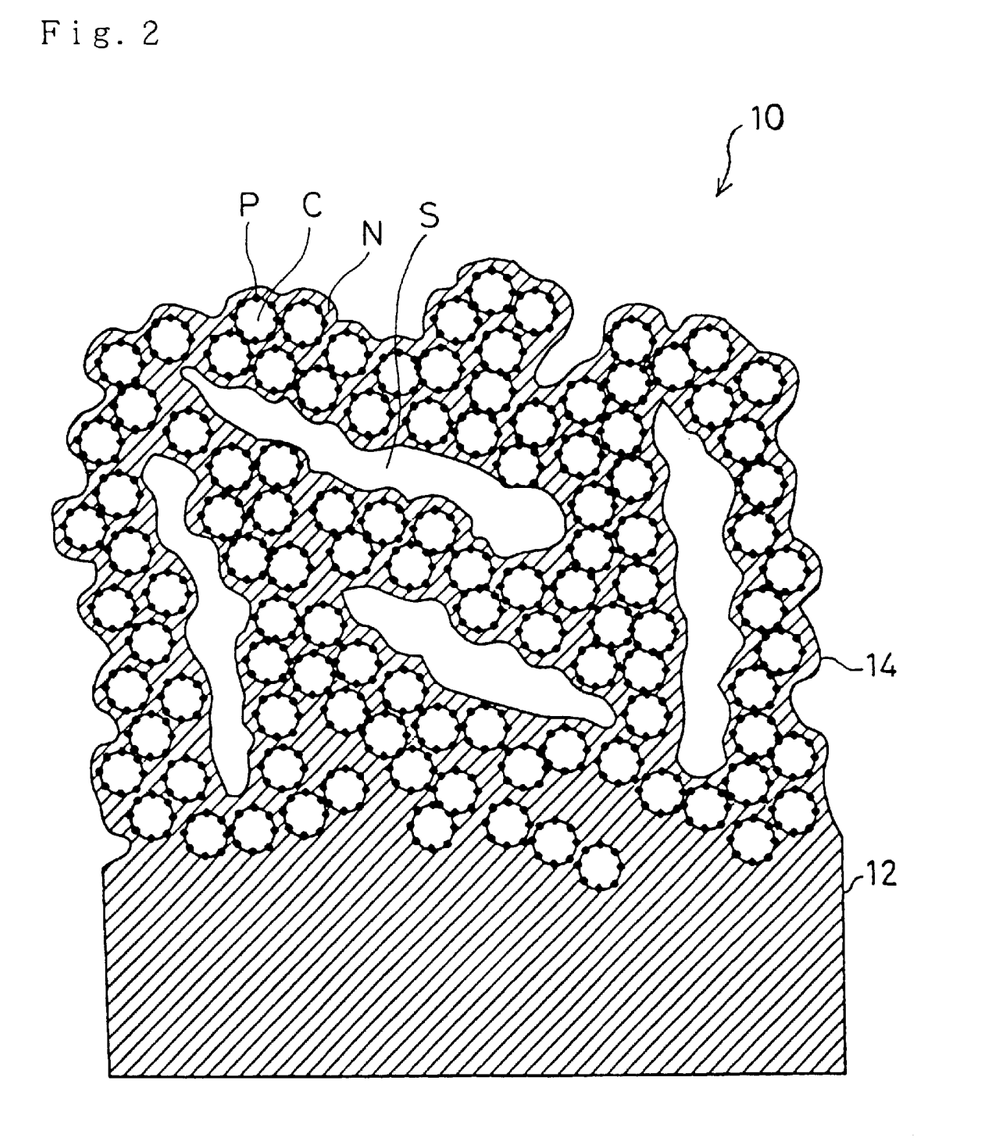
FIG. 2 schematically illustrates structure of the electricity-generating layer 10 manufactured according to the routine of FIG. 1.

The following describes best modes of carrying out the present invention as preferred embodiments. FIG. 1 is a flowchart showing a typical routine of manufacturing an electricity-generating layer 10 that is a joint body of an electrolyte membrane 12 and a catalyst electrode 14 and embodies the present invention. FIG. 2 schematically illustrates structure of the electricity-generating layer 10 manufactured according to the routine of FIG. 1. The concrete steps of manufacturing the electricity-generating layer 10 will be described first based on the flowchart of FIG. 1.

When the program enters the manufacturing routine of the electricity-generating layer 10, a paste-like ink is prepared first at step S100 by dissolving a pore-forming agent F or a subliming substance that sublimes under a predetermined condition in a solvent, simultaneously with dispersing catalyst-carrying carbon C in the solvent. In this embodiment, a paste-like ink was prepared by mixing 1 g of the catalyst-carrying carbon C (mean particle diameter: approximately 20 nm) that carries 20 percent by weight of fine particles (mean particle diameter: approximately 1 nm) of platinum or an alloy of platinum and another metal as a catalyst P with 3 ml of 5 percent by weight of an electrolytic solution N (for example, Naphion Solution by Aldrich Chemical Corp.), 5 ml of an alcoholic solvent (such as ethanol or isopropyl alcohol), and 2 g of camphor as the pore-forming agent F, and applying ultrasonic waves so as to make camphor completely dissolved into the solvent and the catalyst-carrying carbon C homogeneously dispersed. The amount of addition of the pore-forming agent F depends upon its solubility into the solvent as well as the strength, gas permeability, and electrical conductivity of the catalyst electrode 14 of the electricity-generating layer 10 manufactured. In this embodiment, ultrasonic waves having the frequency of 30 to 50 kHz and emitted by a commercially available ultrasonic cleaner were applied for the dissolution and dispersion.

At subsequent step S102, a sheet-like electrode-forming member is formed on the electrolyte membrane 12 by screen printing the paste-like ink thus obtained. In accordance with a concrete procedure, the paste-like ink was screen printed on the electrolyte membrane 12, so that a sheet-like electrode-forming member of 5 to 500 μm thick or more preferably of 10 to 300 μm thick (100 μm thick in this embodiment) was formed on the electrolyte membrane 12. The electrolyte membrane 12 was an ion-exchange membrane of 25 to 200 μm thick or more preferably of 50 to 150 μm thick that was mainly composed of a fluororesin. For example, a perfluorocarbon sulfonate polymer membrane, such as one commercially available under the trade name of 'Naphion' manufactured by du Pont, was applied for the electrolyte membrane 12.

The pore-forming agent F included in the sheet-like electrode-forming member and dissolved in the solvent is separated out at step S104. The deposition of the pore-forming agent F is implemented by evaporating the solvent so as to make the concentration of the pore-forming agent F in the solvent equal to or greater than its solubility, or alternatively by varying the temperature of the electrode-forming member so as to vary the solubility of the pore-forming agent F in the solvent. The number and size of crystals of the depositing pore-forming agent F are varied with a change rate of the state of the solvent (such as evaporation of the solvent or a variation in temperature). The change rate of the state of the solvent is determined according to the gas permeability and electrical conductivity of the catalyst electrode 14 manufactured. A slow change of the state of the solvent results in depositing a less number of but relatively large crystals, whereas an abrupt change gives a large number of small crystals. The size of pores S formed in the catalyst electrode 14 is accordingly adjusted by regulating the change rate of the state of the solvent. In this embodiment, the electrode-forming member was dried at ordinary temperature for two hours with a view to evaporating the alcoholic solvent, so that camphor used as the pore-forming agent F was deposited in the electrode-forming member. The depositing pore-forming agent F generally has a needle-like or plate-like shape.

After the deposition of the pore-forming agent F, the electrolyte membrane 12 is joined with the electrode-forming member at step S106. The hot pressing process including heating and pressurizing steps is generally applied to join the electrolyte membrane 12 with the electrode-forming member. The temperature and the pressure in the hot pressing process should be determined in order to enable the pore-forming agent F to be stable and maintain the solid state. In this embodiment, the electrolyte membrane 12 was joined with the electrode-forming member by pressing them five minutes under the conditions of 125° C. and 5 MPa, which enable camphor to be stable and maintain the solid state.

The joint body of the electrolyte membrane 12 and the electrode-forming member is held under a predetermined condition, so as to sublimate the pore-forming agent F at step S108. This completes the production of the electricity-generating layer 10 including the electrode-forming member as the catalyst electrode 14 having a plurality of pores S. The predetermined condition should sublimate the pore-forming agent F, while not causing physical or chemical variations in the other constituents of the electrode-forming member or the electrolyte membrane 12. In this embodiment, the joint body of the electrolyte membrane 12 and the electrode-forming member was dried under vacuum for three hours at the temperature of 80° C., which are the conditions of sublimating camphor while not varying the electrolyte membrane 12 and the other constituents. This process thoroughly sublimated and removed camphor, which was used as the pore-forming agent F, from the electrode-forming member and completed the production of the electricity-generating layer 10. The electricity-generating layer 10 thus manufactured is a joint body of the catalyst electrode 14 having a plurality of needle-like or plate-like pores S and the electrolyte membrane 12 having the favorable performance substantially unchanged.

Figure 3:
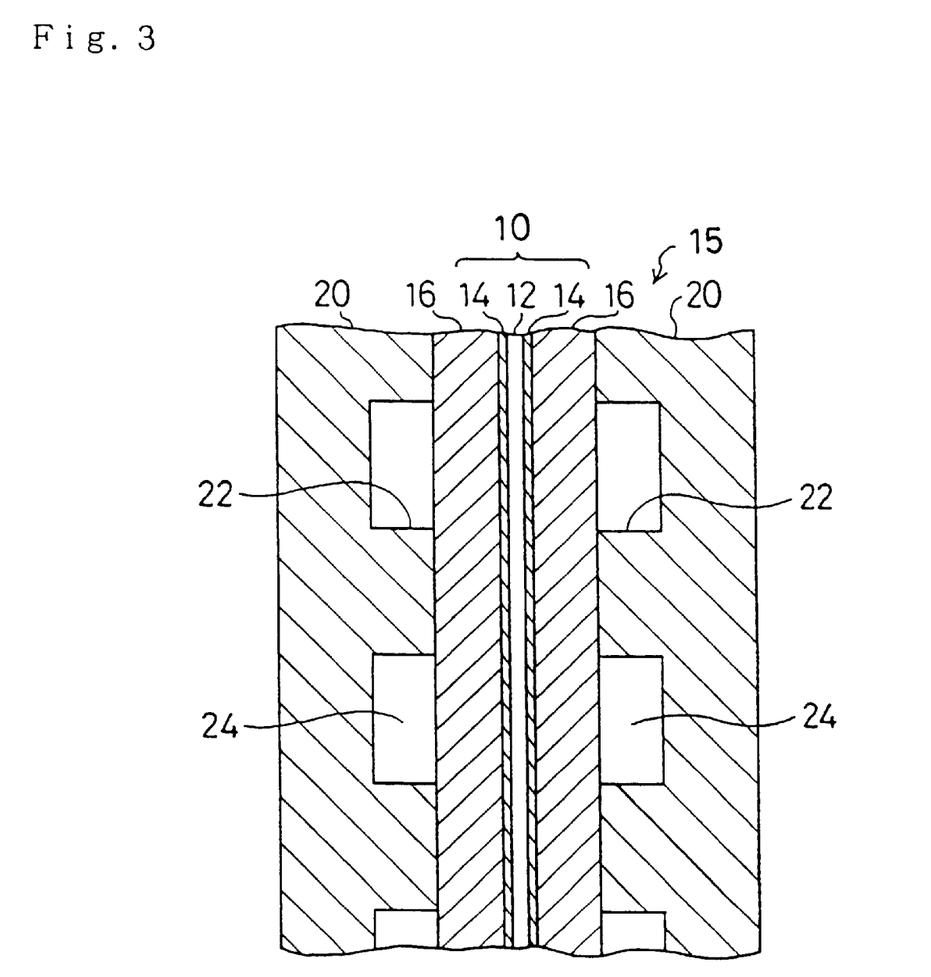
FIG. 3 schematically illustrates structure of a fuel cell 15 including the electricity-generating layer 10 of the embodiment.

The following describes a fuel cell 15 prepared from the electricity-generating layer 10 manufactured in the above manner. FIG. 3 schematically illustrates structure of the fuel cell 15 including the electricity-generating layer 10 of the embodiment. Referring to FIG. 3, the fuel cell 15 includes the electricity-generating layer 10 that is manufactured according to the above routine and represents the joint body of one electrolyte membrane 12 and two catalyst electrodes 14, two gas diffusion electrodes 16 arranged across the electricity-generating layer 10, and two current-collecting electrodes 20, each of which is disposed opposite to the electricity-generating layer 10 across the gas diffusion electrode 16.

The two gas diffusion electrodes 16 are practically made of carbon cloth, which is woven of yarns including carbon fibers coated with polytetrafluoroethylene and non-treated carbon fibers at the ratio of 1 to 1. The water repellency of polytetrafluoroethylene coating the carbon fibers effectively prevents the whole surface of the gas diffusion electrode 16 from being covered with water, so that the gas diffusion electrode 16 has favorable gas permeability.

The current-collecting electrodes 20 are mainly made of dense carbon which is prepared by compressing carbon and has gas impermeability. A plurality of ribs 22 arranged in parallel are formed on one surface of each current-collecting electrode 20 that is in contact with the gas diffusion electrode 16. The ribs 22 and the gas diffusion electrodes 16 define a plurality of flow paths 24 for an oxidizing gas (such as the air) containing oxygen and for a gaseous fuel (such as a methanol-reforming gas) containing hydrogen.

In the fuel cell 15 thus constructed, supplies of a gaseous fuel and an oxidizing gas into the flow paths 24 that are defined by the two gas diffusion electrodes 16 and the current-collecting electrodes 20 arranged across the electricity-generating layer 10 and the gas diffusion electrodes 16 are fed to the two catalyst electrodes 14 which are disposed across the electrolyte membrane 12. The electrochemical reactions expressed as the reaction formulae (1) and (2) discussed above accordingly proceed to directly convert the chemical energy to electrical energy.

Figure 4:
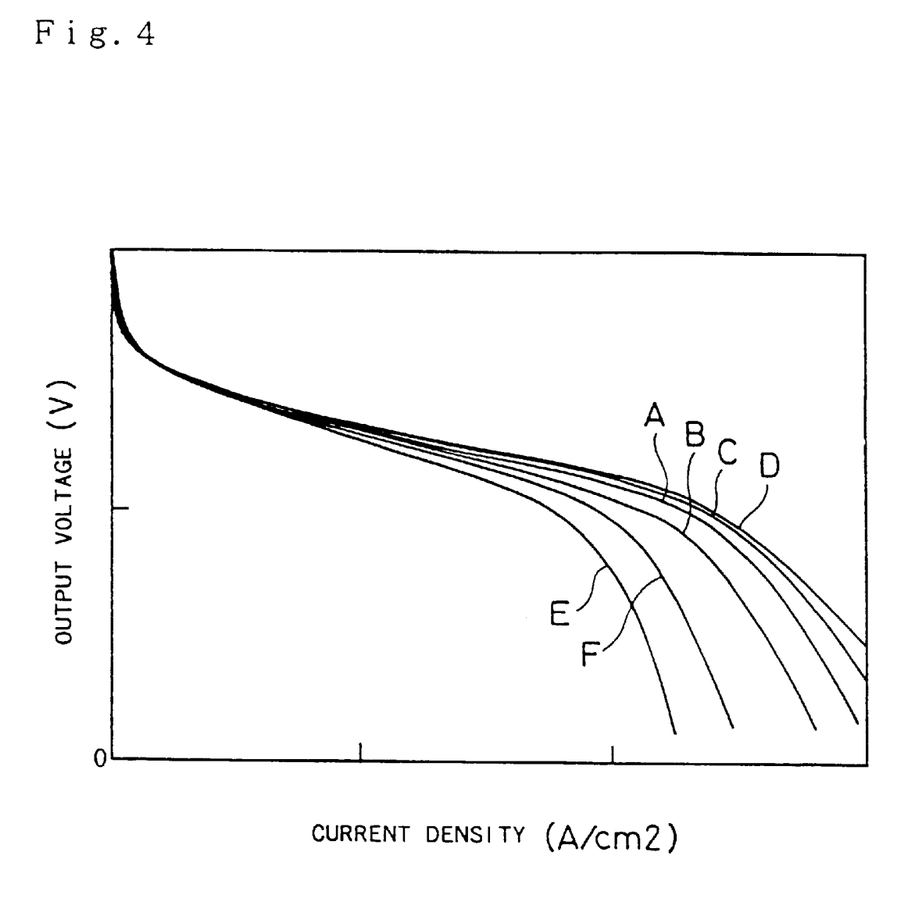
FIG. 4 is a graph showing the relationship between the current density and the output voltage in the fuel cell 15 of the embodiment and conventional fuel cells.
Figure 5:
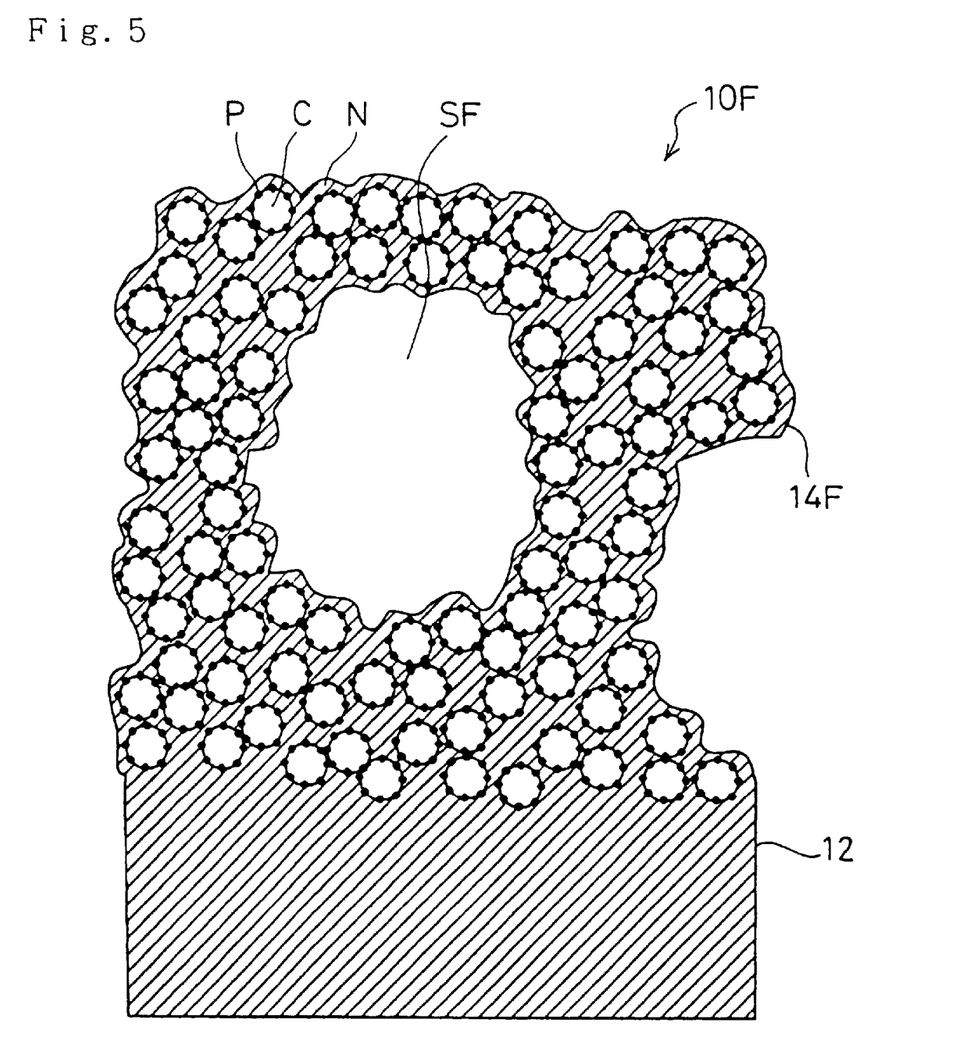
FIG. 5 is an enlarged view schematically illustrating structure of an electricity-generating layer included in a conventional fuel cell.

The performance of the fuel cell 15 of the embodiment constructed in the above manner is compared with those of conventional fuel cells. FIG. 4 is a graph showing the relationship between the current density and the output voltage in the fuel cell 15 of the embodiment and conventional fuel cells. FIG. 5 schematically illustrates structure of a catalyst electrode included in a conventional fuel cell. In the graph of FIG. 4, a curve A represents the relationship between the current density and the voltage in the fuel cell 15 including the electricity-generating layer 10 of the embodiment, a curve E the relationship between the current density and the voltage in one conventional fuel cell including an electricity-generating layer that is prepared by joining a pore-free catalyst electrode (not shown) with an electrolyte membrane (hereinafter referred to as Reference 1), and a curve F the relationship between the current density and the voltage in another conventional fuel cell including an electricity-generating layer 10F (see FIG. 5) that is prepared by joining the electrolyte membrane 12 with a catalyst electrode 14F having pores SF formed by a granular pore-forming agent of a metal salt (hereinafter referred to as Reference 2). The other curves B through D will be discussed later.

Although not being illustrated, the catalyst electrode of the electricity-generating layer included in Reference 1 does not have any pores but includes catalyst-carrying carbon C in a densely packed condition. Compared with the catalyst electrode 14 of the electricity-generating layer 10 included in the fuel cell 15 of the embodiment, the catalyst electrode of Reference 1 has lower gas permeability and higher electrical conductivity. The graph of FIG. 4 clearly shows the comparison of performance between Reference 1 and the fuel cell 15 of the embodiment. Both fuel cells have comparable performances in a range of low current density that has little effect of the gas permeability but relatively severe effect of the electrical conductivity of the catalyst electrode. In a range of high current density that is significantly affected by the gas permeability, on the other hand, the fuel cell 15 of the embodiment has remarkably better performance than that of Reference 1.

The catalyst electrode 14F of the electricity-generating layer 10F included in Reference 2 is prepared by mixing 1 g of catalyst-carrying carbon C with 500 mg of calcium carbonate powder (mean particle diameter: 1 $\mu$m) to yield an electrode-forming member, joining the electrode-forming member with the electrolyte membrane 12 under the conditions identical with those of the embodiment, and eluting calcium carbonate included in the electrode-forming member with a highly acidic aqueous solution. Since granular calcium carbonate is used as the pore-forming agent, the pores SF existing in the catalyst electrode 14F are formed by connecting substantially spherical voids of 1 $\mu$m in mean diameter with one another via connection holes of smaller diameter as shown in FIG. 5. The gas permeability of the catalyst electrode generally depends upon the diameter of pores. The gas permeability of the catalyst electrode 14F accordingly depends upon the diameter of the connection holes that connect the voids with one another. In order to ensure the sufficient gas permeability, a space greater than that actually required should be formed inside the catalyst electrode 14F. This undesirably narrows the conductive area of the catalyst electrode 14F to lower its electrical conductivity and makes the catalyst electrode 14F relatively brittle. The pores S existing in the catalyst electrode 14 of the fuel cell 15 of the embodiment are, on the other hand, formed by deposition of the pore-forming agent F and have a needle-like or plate-like shape. No space greater than that actually required is thus formed for the sufficient gas permeability. This means that the pores S have sufficient performance for permeation of the gas. As shown in FIG. 4, although Reference 2 has better performance than Reference 1 in the range of high current density having the severer effect of the gas permeability, it does not at all reach the performance level of the fuel cell 15 of the embodiment.

The above discussion clearly proves that the difference in performance between the fuel cell 15 of the embodiment and References 1 and 2 is ascribed to the difference in performance of the electricity-generating layer 10 or more specifically the catalyst electrode 14 of the fuel cell 15.

As discussed above, the manufacturing process of the embodiment gives the electricity-generating layer 10 that is the joint body of the catalyst electrode having the sufficient gas permeability and electrical conductivity and the electrolyte membrane having the favorable performance substantially unchanged. Deposition of the pore-forming agent F dissolved in the solvent enables uniform pores S of needle-like or plate-like shape to be formed in the catalyst electrode 14. After the deposition of the pore-forming agent F, the electrolyte membrane 12 and the electrode-forming member are joined with each other under the conditions that keep the pore-forming agent F stable and in the solid state. This further decreases the contact resistance of the electrolyte membrane 12 against the catalyst electrode 14. The pores S are then formed by sublimating and removing the pore-forming agent F from the electrode-forming member. This effectively prevents deterioration of the performance of the electrolyte membrane 12 due to metal ions, which are generated in the conventional process using a pore-forming agent composed of a metal or metal salt. This allows the performance of the electrolyte membrane 12 to be favorably kept at a high level.

Although camphor is used as the pore-forming agent F in the manufacturing process of the embodiment discussed above, any other chemicals that can be dissolved in a solvent and have lower vapor pressures than that of the solvent may also be applicable. Examples of applicable chemicals include naphthalene, α-naphthol, paradichlorobenzene, catechol, 2,5-xylenol, 2,3-xylenol, 3,5-xylenol, and 1,2,4,5-tetramethylbenzene. Note that the conditions of depositing the pore-forming agent F (step S104), the conditions of joining the electrolyte membrane 12 with the electrode-forming member by the hot pressing method (step S106), and the conditions of sublimating the pore-forming agent F (step S108) in the manufacturing process of FIG. 1 are varied with the properties of the chemical selected for and used as the pore-forming agent F. In some chemicals used as the pore-forming agent F, there may be no adequate conditions of joining the electrolyte membrane 12 with the electrode-forming member by the hot pressing method (step S106) in the manufacturing process. In such cases, the electrolyte membrane 12 may not be joined with the electrode-forming member. Even in case that the electrolyte membrane 12 is not joined with the electrode-forming member, the electrode-forming member is formed on the electrolyte membrane 12 by screen printing, so that the electrolyte membrane 12 and the catalyst electrode 14 are gently connected to each other. A concrete example using naphthalene as the pore-forming agent F is described below.

In case that naphthalene is used for the pore-forming agent F, the conditions of depositing the pore-forming agent F (step S104) in the manufacturing process are identical with those of the above embodiment using camphor as the pore-forming agent F. Since naphthalene readily sublimes, no adequate conditions can be found for the process of joining the electrolyte membrane 12 with the electrode-forming member by the hot pressing method (step S106). The electrolyte membrane 12 is accordingly not joined with the electrode-forming member by the hot pressing method when naphthalene is selected as the pore-forming agent F. Since naphthalene readily sublimes, no evacuation is required for the sublimation of the pore-forming agent F (step S108), but the electrolyte membrane 12 and the electrode-forming member are dried under the atmospheric pressure at 80° C. for one hour. A curve B in the graph of FIG. 4 represents the performance (relationship between the current density and the voltage) of a fuel cell including an electricity-generating layer manufactured with naphthalene as the pore-forming agent F, in place of the electricity-generating layer 10 of the above embodiment. Referring to FIG. 4, compared with the fuel cell 15 of the embodiment (curve A), the fuel cell including the electricity-generating layer manufactured with naphthalene as the pore-forming agent F shows deteriorating performance due to an increase in contact resistance. This is ascribed to the fact that the electrolyte membrane 12 is not joined with the electrode-forming member by the hot pressing method. Compared with References 1 and 2, however, the fuel cell of curve B shows remarkably better performance in the range of high current density with the severer effect of the gas permeability. The manufacturing process of the electricity-generating layer can be simplified by using a chemical that readily sublimes under the atmospheric pressure, such as naphthalene, as the pore-forming agent F.

In the manufacturing process of the embodiment shown in FIG. 1, preparation of ink by dissolving the pore-forming agent F and dispersing the catalyst-carrying carbon C (step S100) and formation of the electrode-forming member on the electrolyte membrane 12 (step S102) are carried out at room temperature. These steps may, however, be implemented at a predetermined temperature. The solubility of the pore-forming agent F into the solvent is significantly affected by the temperature of the solvent. Adequate adjustment of the temperature enables a certain amount of the pore-forming agent F which can not be dissolved at room temperature to be dissolved into a predetermined amount of the solvent. This allows the amount of addition of the pore-forming agent F to be regulated in a wider range, thereby enabling the porosity of the catalyst electrode 14 included in the electricity-generating layer 10 manufactured to be freely controlled. By way of example, the regulated temperature of 60° C. allows 6 g of camphor (pore-forming agent F) which can not be dissolved at room temperature to be dissolved in 5 ml of the solvent discussed above. In this case, a greater amount of the pore-forming agent F deposits, so that the joint body of the electrolyte membrane 12 and the electrode-forming member is dried at 80° C. for five hours (step S108) in order to ensure complete sublimation of the pore-forming agent F.

A curve C in the graph of FIG. 4 represents the performance (relationship between the current density and the voltage) of a fuel cell including an electricity-generating layer thus manufactured, in place of the electricity-generating layer 10 of the above embodiment. Referring to FIG. 4, compared with the fuel cell 15 of the embodiment (curve A), the fuel cell including the electricity-generating layer manufactured by dissolving 6 g of camphor as the pore-forming agent F shows some improvement in performance. The solubility of the pore-forming agent F into the solvent can be varied by adjusting the temperature conditions adopted for the preparation of ink by dissolving the pore-forming agent F and dispersing the catalyst-carrying carbon C (step S100) and the formation of the electrode-forming member on the electrolyte membrane 12 (step S102) in the manufacturing process. The amount of addition of the pore-forming agent F can thus be set freely in the range of solubility. This enables the porosity of the catalyst electrode 14 included in the electricity-generating layer 10 thus manufactured to be controlled arbitrarily.

In the manufacturing process of the embodiment shown in FIG. 1, the sheet-like electrode-forming member is formed on the electrolyte membrane 12 at step S102. In accordance with an alternative procedure, the electrode-forming member may not be formed on the electrolyte membrane 12. An electrode-forming member is formed on a flat and peelable substance, and the solvent included in the electrode-forming member is evaporated to allow deposition of the pore-forming agent F. Production of a catalyst electrode is then completed by sublimating the depositing pore-forming agent F. In this case, the above steps are not included in the manufacturing process of the electricity-generating layer but constitute the manufacturing process of the catalyst electrode. The modified manufacturing process of the electricity-generating layer, wherein the preparation of ink by dissolving the pore-forming agent F and dispersing the catalyst-carrying carbon C (step S100) and the formation of the electrode-forming member on the electrolyte membrane 12 (step S102) are carried out at a predetermined temperature, is also applicable to the manufacturing process of the catalyst electrode.

Figure 6:
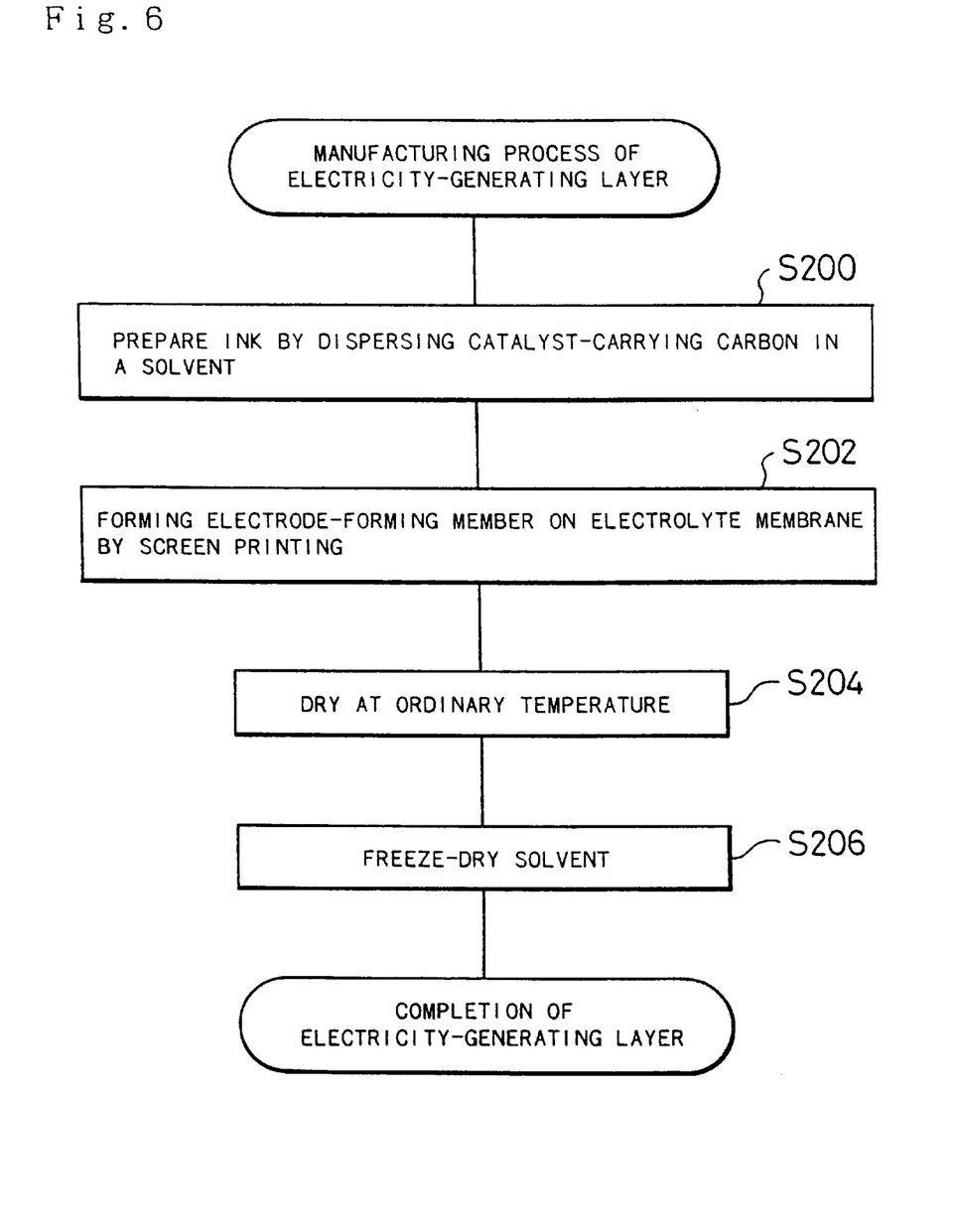
FIG. 6 is a flowchart showing a typical routine of manufacturing an electricity-generating layer 50 that is a joint body of an electrolyte membrane 52 and a catalyst electrode 54 as a second embodiment according to the present invention.
Figure 7:
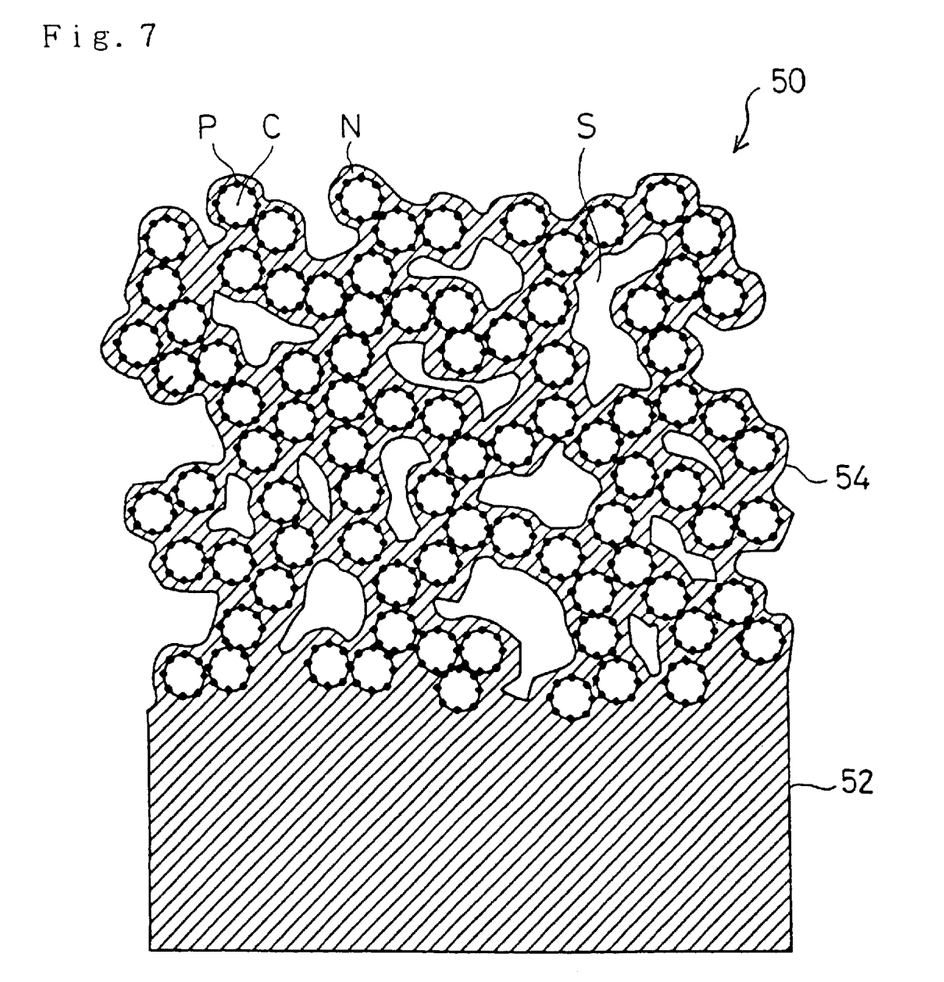
FIG. 7 schematically illustrates structure of the electricity-generating layer 50 manufactured according to the routine of FIG. 6.

The following describes the manufacturing process of an electricity-generating layer 10 as a second embodiment according to the present invention. FIG. 6 is a flowchart showing a typical routine of manufacturing the electricity-generating layer 50 of the second embodiment that is a joint body of an electrolyte membrane 52 and a catalyst electrode 54. FIG. 7 schematically illustrates structure of the electricity-generating layer 50 manufactured according to the routine of FIG. 6.

When the program enters the routine of manufacturing the electricity-generating layer 50, a paste-like ink is prepared first at step S200 by dispersing catalyst-carrying carbon C in a solvent. In the second embodiment, a paste-like ink was prepared by mixing 1 g of catalyst-carrying carbon C with 3 ml of 5 percent by weight of an electrolytic solution N and 7 ml of cyclohexanol as a solvent and applying ultrasonic waves so as to make the catalyst-carrying carbon C homogeneously dispersed. The catalyst-carrying carbon C and the electrolytic solution N used in the second embodiment are identical with the catalyst-carrying carbon C and the electrolytic solution N discussed in the first embodiment, whereas the ultrasonic waves applied in the second embodiment are identical with those of the first embodiment.

At subsequent step S202, a sheet-like electrode-forming member is formed on the electrolyte membrane 52 by screen printing the paste-like ink thus obtained. The electrolyte membrane 52 of the second embodiment is composed of the same material as that of the electrolyte membrane 12 of the first embodiment. The electrode-forming member on the electrolyte membrane 52 is then dried at ordinary temperature for one hour at step S204. This drying process controls the quantity of the solvent remaining in the electrode-forming member in a subsequent process of freeze-drying the electrode-forming member discussed later. The drying time is varied with the quantity of the solvent used for the preparation of the ink. In case that the quantity of the solvent used for the preparation of the ink coincides with the quantity of the solvent favorably remaining in the process of freeze-drying the electrode-forming member, the processing of step S204, that is, the drying process at ordinary temperature, is not required.

Figure 8:
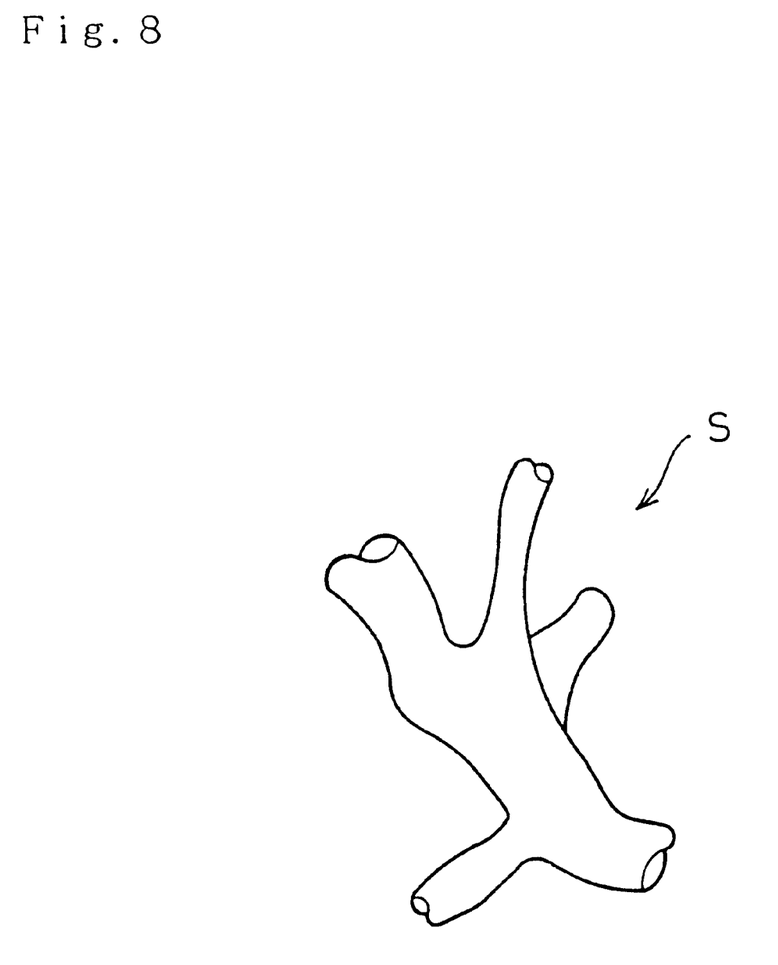
FIG. 8 shows structure of a pore S formed in the catalyst electrode 54 of the second embodiment.

After the adjustment of the quantity of the solvent remaining in the electrode-forming member, the electrode-forming member on the electrolyte membrane 52 is placed at a low temperature, which allows freeze of the solvent, and the solvent is then dried under vacuum at step S206. This completes the production of the electricity-generating layer 50 including the electrode-forming member as the catalyst electrode 54 with a plurality of pores S. Freezing the solvent enables the solvent in the electrode-forming member to act as a pore-forming agent, and drying the solvent under reduced pressure sublimates the frozen solvent. In the second embodiment, the electrode-forming member formed on the electrolyte membrane 52 was placed in a freeze-dryer, and the solvent (cyclohexanol) in the electrode-forming member was frozen at −30° C. The freeze-dryer was evacuated with a vacuum pump, and the frozen solvent was accordingly vaporized and removed. This gave the electricity-generating layer 50 including the electrode-forming member as the catalyst electrode 54 with a plurality of pores S. Since the solvent is frozen by abrupt cooling, the pores S thus formed in the catalyst electrode 54 have an extremely small size (0.02 to 0.3 $\mu$m in diameter). The shape of the pores S corresponds to the shape of the solvent that occupies in the frozen ink. As illustrated in FIG. 8, each pore S has a three-dimensional diversified structure having various diameters. The diameter and the porosity of the pores S in the catalyst electrode 54 are determined according to the quantity of the solvent remaining in the electrode-forming member immediately before the freeze-drying process and the degree of dispersion of the catalyst-carrying carbon C. The diameter and the porosity of the pores S of the catalyst electrode 54 can thus be controlled to desirable values by regulating the degree of dispersion of the catalyst-carrying carbon C and adjusting the quantity of the solvent remaining in the electrode-forming member in the process of preparing the ink at step S200 or in the drying process at ordinary temperature at step S204. The temperature of freezing the solvent and the degree of evacuation should be determined depending upon the properties of the solvent used.

A curve D in the graph of FIG. 4 represents the performance (relationship between the current density and the voltage) of a fuel cell including the electricity-generating layer 50 of the second embodiment thus prepared and having the structure shown in FIG. 3. Referring to FIG. 4, the fuel cell including the electricity-generating layer 50 of the second embodiment has the performance equivalent to or better than that of the fuel cell 15 including the electricity-generating layer 10 of the first embodiment. Compared with Reference 1 (curve E) and Reference 2 (curve F), the fuel cell of the second embodiment shows a remarkable improvement in performance.

In the electricity-generating layer 50 of the second embodiment discussed above, the catalyst electrode 54 includes pores S having an extremely small size (diameter) and a three-dimensional diversified structure. The catalyst electrode 54 accordingly has sufficient gas permeability and electrical conductivity, thereby improving the performance of the resulting fuel cell.

The manufacturing process of the second embodiment gives the electricity-generating layer 50 that is a joint body of the catalyst electrode having the sufficient gas permeability and electrical conductivity and the electrolyte membrane having the preferable performance substantially unchanged. The pores S are formed in the catalyst electrode 54 by freeze-drying the solvent, and no specific pore-forming agent is thus required in the second embodiment. Abrupt cooling to freeze-dry the solvent enables the pores S having an extremely small size (diameter) and a three-dimensional diversified structure to be formed in the catalyst electrode 54. Manufacture of the catalyst electrode 54 by freeze-drying the solvent allows the pores S to be formed uniformly in the whole catalyst electrode 54.

Although cyclohexanol is used as the solvent in the manufacturing process of the second embodiment, any other solvent that disperses the catalyst-carrying carbon C and can be freeze-dried, for example, the alcoholic solvent discussed above, may also be applicable.

In the manufacturing process of the second embodiment shown in FIG. 6, the sheet-like electrode-forming member is formed on the electrolyte membrane 52 at step S202. The electrode-forming member may, however, not be formed on the electrolyte membrane 52. In this case, the catalyst electrode is formed instead of the electricity-generating layer. In accordance with a concrete procedure, an electrode-forming member is formed on a flat and peelable substance. After the quantity of the solvent remaining in the electrode-forming member is adjusted, the electrode-forming member is placed at a low temperature, which allows freeze of the solvent. The solvent is then dried under reduced pressure, so as to complete the catalyst electrode.

The present invention is not restricted to the above embodiments or applications, but there may be many modifications, changes, and alterations without departing from the scope and the spirit of the main characteristics of the present invention. It should be clearly understood that the embodiments discussed above are only illustrative and not restrictive in any sense. The scope and spirit of the present invention are limited only by the terms of the appended claims.

What is claimed is:

1. A method of manufacturing an electrode for a fuel cell, said electrode having a plurality of pores and comprising carbon particles with a catalyst carried thereon, said method comprising:
   (a) preparing an electrode-forming member comprising said carbon particles by:
      (a1) dissolving said pore-forming agent that can be sublimed into a solvent that allows dissolution of said pore-forming agent and dispersing said carbon particles in the solvent, so as to prepare a mixture;
      (a2) forming the mixture into a predetermined shape of said electrode-forming member; and
      (a3) drying the mixture formed into the predetermined shape, thereby achieving deposition of said pore-forming agent: and
   (b) subliming said pore-forming agent.

2. A method in accordance with claim 1, wherein said steps (a1) and (a2) are carried out at a predetermined temperature that allows solubility of said pore-forming agent in the solvent to be equal to or higher than a predetermined level.

3. A method of manufacturing an electrode-electrolyte membrane joint body for a fuel cell, said electrode-electrolyte membrane joint body comprising:
   an electrode having a plurality of pores, said electrode comprising carbon particles with a catalyst carried thereon; and
   an electrolyte membrane comprising a polymer electrolyte, said method comprising:
      (a) preparing an electrode-forming member comprising said carbon particles and a pore-forming agent that can be sublimed;
      (b) joining said electrode-forming member with said electrolyte membrane; and
      (c) subliming said pore-forming agent.

4. A method in accordance with claim 3, wherein said step (a) further comprises:
   (a1) dissolving said pore-forming agent into a solvent that allows dissolution of said pore-forming agent and dispersing said carbon particles in the solvent, so as to prepare a mixture;
   (a2) forming the mixture into a predetermined shape of said electrode-forming member; and
   (a3) depositing said pore-forming agent.

5. A method in accordance with claim 4, wherein said step (a3) further comprises:
   drying the mixture formed into the predetermined shape, thereby allowing deposition of said pore-forming agent.

6. A method in accordance with claim 4, wherein said steps (a1) and (a2) are conducted at a predetermined temperature that allows solubility of said pore-forming agent he solvent to be equal to or higher than a predetermined level.

7. A method in accordance with claim 5, wherein said steps (a1) and (a2) are carried out at a predetermined temperature that allows solubility of said pore-forming agent in the solvent to be equal to or higher than a predetermined level.

8. A method of manufacturing an electrode for a fuel cell, said electrode having a plurality of pores and comprising carbon particles with a catalyst carried thereon, said method comprising:
   (a) preparing an electrode-forming member comprising said carbon particles by:
      (a1) dissolving said pore-forming agent that can be sublimed into a solvent that allows dissolution of said pore-forming agent at a predetermined temperature that solubilizes the pore-forming agent in the solvent to an extent that is equal to or greater than a predetermined level and dispersing said carbon particles in the solvent, so as to prepare a mixture;
      (a2) forming the mixture into a predetermined shape of said electrode-forming member at a predetermined temperature that solubilizes the pore-forming agent in the solvent to an extent that is equal to or greater than a predetermined level; and
      (a3) drying the mixture formed into the predetermined shape, thereby achieving deposition of said pore-forming agent; and
   (b) subliming said pore-forming agent.

* * * * *